United States Patent
Burns et al.

[19]

[11] Patent Number: 6,134,624
[45] Date of Patent: Oct. 17, 2000

[54] HIGH BANDWIDTH CACHE SYSTEM

[75] Inventors: William A. Burns, Boulder; Stephen S. Selkirk, Broomfield; Nicholas J. Krull; Mark C. Briel, both of Louisville, all of Colo.

[73] Assignee: Storage Technology Corporation, Louisville, Colo.

[21] Appl. No.: 09/093,140

[22] Filed: Jun. 8, 1998

[51] Int. Cl.[7] .............................. G06F 13/16; G06F 13/20
[52] U.S. Cl. .............................. 710/131; 710/167; 712/31
[58] Field of Search .................................... 710/131, 105, 710/22, 106, 127, 36, 24, 28, 101, 102, 129, 169, 167, 168, 114, 152; 709/250, 242; 712/1, 31

[56] References Cited

U.S. PATENT DOCUMENTS 4,430,710  2/1984  Catiller et al. ........................... 709/250
4,520,452  5/1985  Loskorn ................................... 710/36

OTHER PUBLICATIONS

"SiI140/SiI141 Datasheet", Silicon Image, Inc. Version 1.0 Dec. 1997, Pub. # DS140/141/001–127–100.

*Primary Examiner*—Daniel H. Pan
*Attorney, Agent, or Firm*—Brooks & Kushman P.C.

[57] ABSTRACT

A direct access storage device (DASD) controller system for serves computer elements such as processors and disk arrays through a serial interconnect scheme. The system includes a plurality of adapters belonging to either a first set or a second set. Cache memory is divided into master memory cards and slave memory cards, each slave memory card in communication with a corresponding master memory card. A plurality of bidirectional multichannel serial data links connects one adapter with one memory card such that every adapter in the first set of adapters is connected to every master memory card and such that every adapter in the second set of adapters is connected to every slave memory card.

26 Claims, 11 Drawing Sheets

Fig. 11

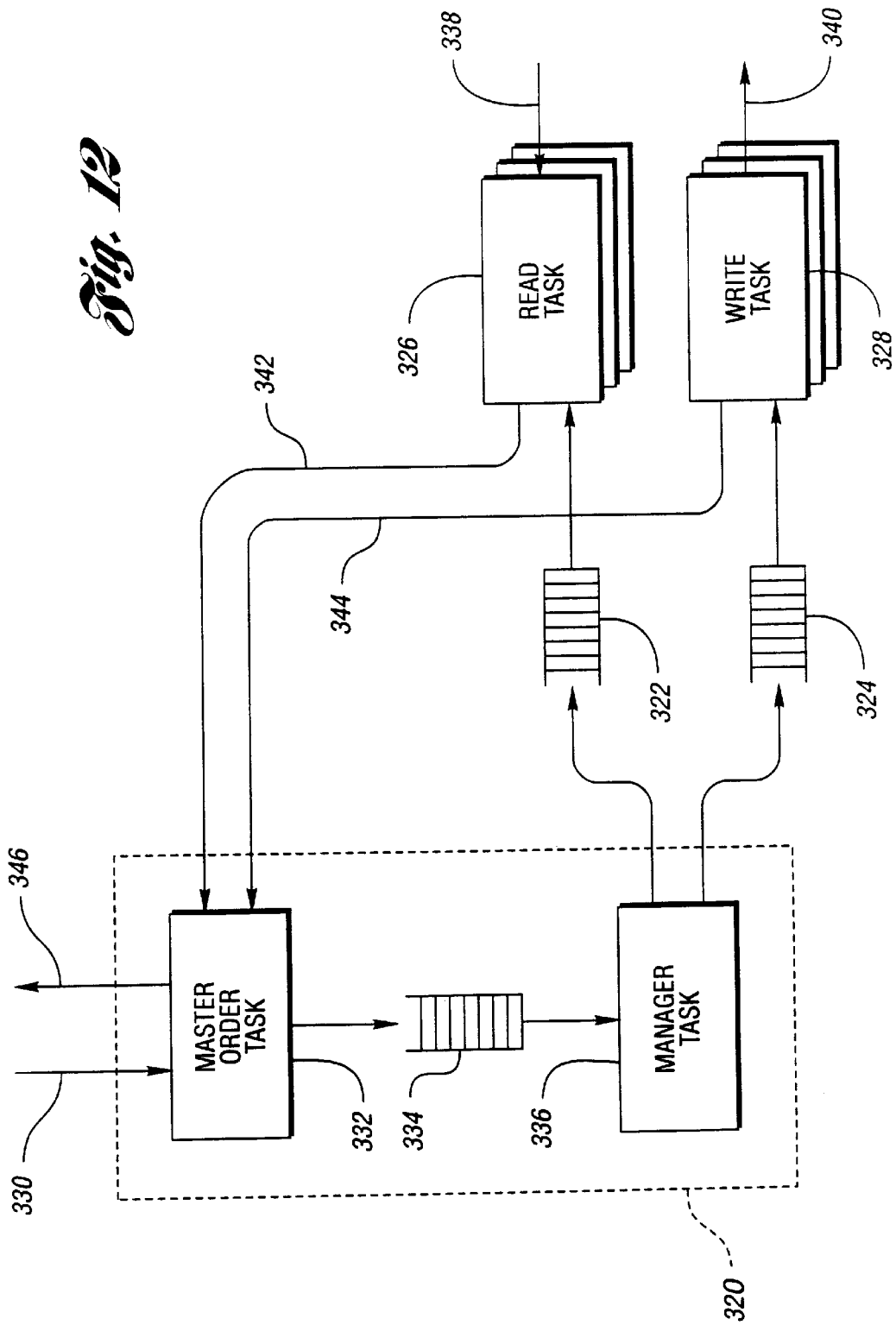

HIGH BANDWIDTH CACHE SYSTEM

TECHNICAL FIELD

The present invention relates to protocols and architectures in cache systems.

BACKGROUND ART

A direct access storage device (DASD) is an on-line digital storage device, such as a magnetic disk drive, that allows rapid read and write operations. Often, DASD systems include more than one disk for increased reliability and crash recovery. Such a system can be a redundant array of inexpensive disks (RAID) unit.

In order to meet greater performance demands, DASD controllers must be capable of handling data at increasing rates. Designing multiple very high data rate channels within a DASD controller unit and, specifically, to and from a central cache memory is limited with current parallel bus structures. Such a parallel bus system in shown in FIG. 1.

One possible solution for increasing the data rate is to make the parallel bus wider by increasing the number of data wires. This results in several difficulties such as a greater number of traces on a printed circuit board (PCB) requiring valuable board real estate, additional driver/receiver pairs, additional connector pins to provide circuit card-to-circuit card interconnection, and increased associated electrical power.

Another possible solution for increasing the data rate is to send parallel bus control signals on dedicated wires. These separate signals, called side-band signals, may signal the start of transmission, provide timing, specify intended receivers, request attention, or indicate success or failure. Using side-band signals increases the number of connecting wires and, hence, suffers from the same drawbacks as increasing the number of data wires.

Still another possible solution for increasing the data rate is to increase the clock rate used on an existing parallel bus. However, decreasing the time between clock edges is limited by the physics of parallel connecting devices. In particular, each device has an associated capacitance. The total capacitance is the sum of the individual capacitances and the distributed capacitance of the interconnecting trace. The velocity of propagation of a signal down the bus is inversely proportional to this total capacitance and, therefore, the clock switching speed is directly limited by the total capacitance.

A further possible solution for increasing the data rate is to use a currently available serial protocol for bussing data within the DASD controller. Such protocols include SONET (Synchronous Optical NETwork), Fiber Channel, and USB (Universal Serial Bus). However, these protocols were designed primarily for connection between devices and not as intradevice busses; and primarily for use with particular interconnection media as fiber optic cable, coaxial cable, or twisted pairs. Therefore, use in PCB busses results in data transfer rates no greater than 200 megabytes per second, below the capabilities achievable using interconnection media for which the existing protocols were designed.

In addition to simply increasing the data rate on a DASD buss, data must be written to two different disks in a RAID 1 system. One solution with current parallel buses is to send the data twice, effectively halving the data transfer rate. Another solution is to provide multiple parallel paths, requiring twice the hardware. Still another solution is to construct a special protocol enabling two recipients to receive the same data, requiring more complex logic in the protocol engine and potential performance degradation.

What is needed is a bus system that can achieve increased data rates without incurring the problems associated with increasing the number of parallel connections, using sideband signals, increasing the clock rate, or using current serial bus protocols. The ability to support RAID should also be provided.

SUMMARY OF THE INVENTION

It is a primary object of the present invention to increase the data transfer rate over existing parallel bus systems.

Another object of the present invention is to require less PCB real estate, fewer driver/receiver pairs, and less interconnections than existing parallel bus systems.

Still another object of the present invention is to develop a bus system with lower cost than existing parallel bus systems.

A further object of the present invention is to support RAID systems.

A still further object is to reduce the number of serial data links required to implement a serial cache system.

In carrying out the above objects and other objects and features of the present invention, a cache system is provided. The cache system includes a plurality of adapters, each adapter in communication with one computer element, and each adapter belonging to either a first set of adapters or a second set of adapters, at least one master memory card, at least one slave memory card, each slave memory card in communication with a corresponding master memory card, and a plurality of bidirectional multichannel serial data links. Each link connects one adapter with one memory card such that every adapter in the first set of adapters is connected to every master memory card and such that every adapter in the second set of adapters is connected to every slave memory card.

In one embodiment, each memory card includes a plurality of memory banks and at least one hub, each hub in communication with every memory bank on the memory card. In a further refinement, each hub on each slave memory card can access each memory bank on the corresponding master memory card and each hub on the corresponding master memory card can access each memory bank on the slave memory card. The hub may be a simplex hub, permitting either memory read or memory write during a memory access period, or may be a duplex hub, permitting simultaneous memory read and memory write during a memory access period.

In another embodiment, each bidirectional multichannel serial link includes a plurality of serial data drivers in the adapter and a plurality of serial data receivers in the memory card, each serial data receiver in the memory card corresponding to one of the plurality of serial data drivers in the adapter. A first set of unidirectional pairs carries serial data from one of the plurality of serial data drivers in the adapter to the corresponding serial data receiver in the memory card. Each bidirectional multichannel serial link also includes a plurality of serial data drivers in the memory card and a plurality of serial data receivers in the adapter, each serial data receiver in the adapter corresponding to one of the plurality of serial data drivers in the memory card. A second set of unidirectional pairs carries serial data from one of the serial data drivers in the memory card to the corresponding serial data receiver in the adapter.

In still another embodiment, each direction of the bidirectional multichannel serial link includes a plurality of serial data drivers, a serial data receiver corresponding to each of the plurality of serial data drivers, the serial data receiver in communication with the corresponding serial data driver, a serial clock driver, and a serial clock receiver in communication with the serial clock driver. In further refinements, at least one serial data driver comprises a flat panel display driver, at least one serial data receiver comprises a flat panel display receiver, the serial clock driver comprises a flat panel display driver, and the serial clock receiver comprises a flat panel display receiver.

In a further embodiment, each adapter has a control logic including a control task to receive a master order, to decompose the master order into read orders and write orders, and to receive status information; a read queue; at least one read task capable of inputting at least one cache read order from the read queue, decomposing the read order into a sequence of cache reads, controlling the sequence of cache reads, and transmitting status information to the control task; a write queue; and at least one write task capable of inputting at least one cache write order, decomposing the at least one write order into a sequence of cache writes, controlling the sequence of cache writes, and transmitting status information to the control task. In a further refinement, the write task can send the same sequence of cache writes to a plurality of memory banks for implementing data mirroring.

A cache system is also provided that includes at least one slave memory card that can send and receive data directly with each adapter in the second set using a data link. Each slave memory card includes at least one memory bank and at least one hub, each hub including a slave arbiter which can determine adapters selected to access the slave memory card. At least one master memory card that can send and receive data directly with each adapter in the first set using a data link as well as send data to and receive data from a corresponding slave memory card is also in the system. Each master memory card has at least one memory bank and at least one hub, each hub including a master arbiter that can determine adapters selected to access the master memory card and determine if the selected adapters from the first and second sets of adapters are granted access to memory banks on the master memory card and the corresponding slave memory card. In a preferred embodiment, each data link is a bidirectional serial multichannel data link.

In one embodiment, the cache system further includes a request line from each adapter in the second set to each slave arbiter, a grant line from each slave arbiter to each adapter in the second set, a request line from each adapter in the first set to each master arbiter, and a grant line from each master arbiter to each adapter in the first set. Each adapter can assert the request line when access to the corresponding memory card is desired. Each arbiter can determine a selected adapter from the appropriate set to which access will be granted for a data access period and can assert the grant line to the selected adapter.

In a refinement, the cache system further includes at least one master bank bus connecting each master memory card to at least one first set adapter, at least one slave bank bus connecting each slave memory card to at least one second set adapter, and an intercard bank bus connecting the at least one slave arbiter to a corresponding master arbiter. Each adapter can place a bank address to which access is requested on the bank bus.

In a further refinement, each slave arbiter can forward the second set adapter bank address to the corresponding master arbiter. The master arbiter is operable to determine if a bank conflict exists between the second set bank address forwarded to the master arbiter and the first set adapter bank address. If a bank conflict exists, the master arbiter can determine which adapter will be granted access to the requested memory bank.

For at least one pair of master and slave memory cards in a cache memory system, an arbitration method is also provided. The method includes receiving an access request in the master memory card from each adapter in the first set requesting access to memory within the card pair, receiving an access request in the slave memory card from each adapter in the second set requesting access to memory within the card pair, determining at least one selected first set adapter if any first set adapter has requested access, determining at least one selected second set adapter if any second set adapter has requested access, receiving at least one memory bank address in the master memory card from each selected first set adapter if any selected first set adapter is determined, receiving at least one memory bank address in the slave memory card from each selected second set adapter if any selected second set adapter is determined, and granting access to selected adapters from the first set and the second set based on preventing more than one access to each memory bank. The method is repeated for each arbitration period.

In one embodiment, where each memory bank is divided into addressable rows, access is granted to selected adapters based on the addresses of rows accessed during the previous arbitration period.

In another embodiment, where each adapter is assigned to a side, access is granted based on the side to which an adapter is assigned. In a refinement, each adapter is further assigned a number, and access is granted based on a round robin algorithm, the algorithm using the adapter number within each side.

In yet another embodiment, where at most one adapter from the first set is selected by the master memory card and at most one adapter from the second set is selected by the slave memory card and where at most one bank address is received by the master memory card and at most one bank address is received by the slave memory card, access is always granted to the selected first set adapter if the bank address from the first set adapter equals the bank address of the second set adapter.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 11 is a conceptualized timing diagram illustrating a control sequence for a duplex embodiment of the present invention; and FIG. 12 is a block diagram of tasks in adapter control logic according to the present invention.

BEST MODES FOR CARRYING OUT THE INVENTION

Figure 1:
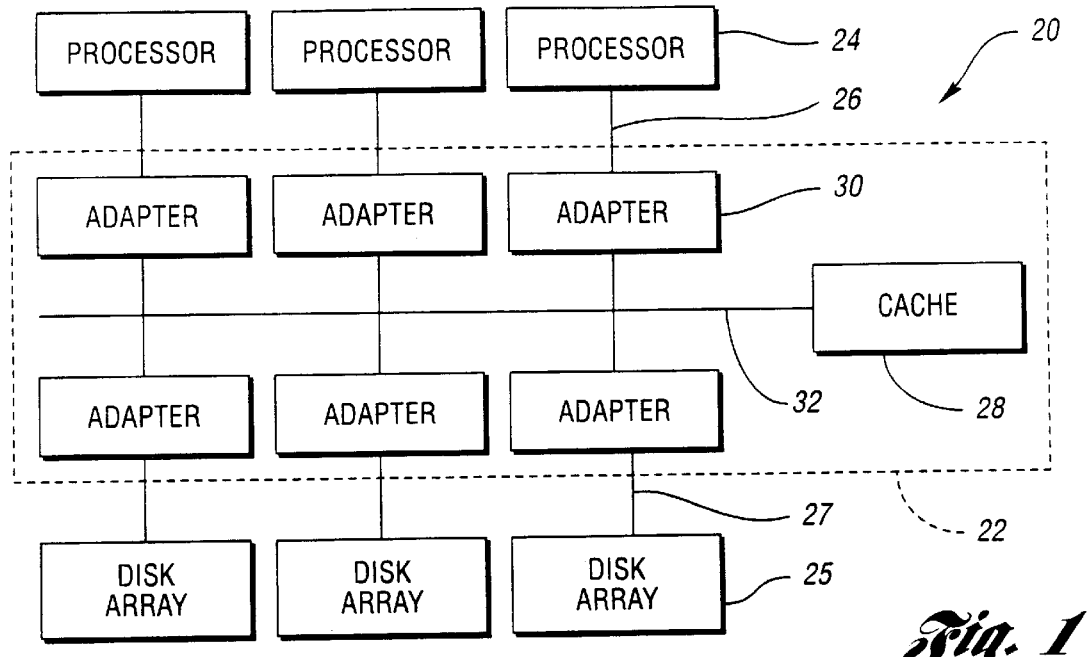
FIG. 1 is a block diagram of a computer system having a DASD controller with a traditional parallel bus architecture.

Referring now to FIG. 1, a block diagram of a computer system having a DASD controller with a traditional parallel bus architecture is shown. Parallel bus computer system 20 includes parallel bus DASD controller 22 and mainframe elements such as processors 24 and disk arrays 25. Processor 24 may be connected to parallel bus DASD controller 22 through processor bus 26 such as SCSI (Small Computer System Interface), ESCON (Enterprise System Connection), HIPPI (High Performance Parallel Interface), Fiber Channel, or FIPS (Federal Information Processing Standard). Disk array 25 may be connected to parallel bus DASD controller 22 through disk array bus 27 such as SCSI or Fiber Channel. Although three processors, three disk arrays, and six adapters are shown, any number of processors and disk arrays together with their associated adapters are possible in computer system 20.

Parallel bus DASD controller 22 contains parallel cache 28. A cache is a large memory system accessible by processor 24 or disk array 25. Parallel adapter 30 is operative to interface with processor 24 or disk array 25 through processor bus 26 or disk array bus 27 respectively and thereby access cache 28 using parallel bus 32.

Figure 2:
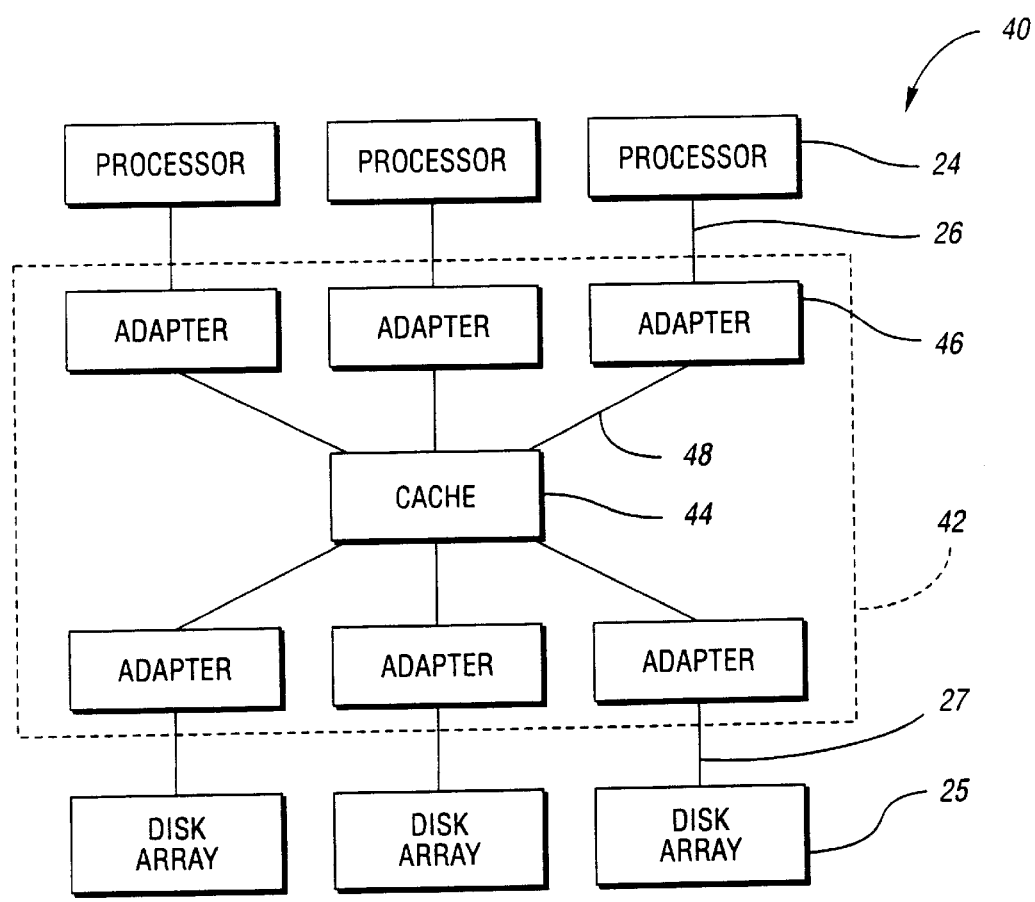
FIG. 2 is a block diagram of a computer system having a DASD controller according to the present invention.

Referring now to FIG. 2, a block diagram of a computer system having a serial link DASD controller is shown. Serial link computer system 40 includes the same processors 24, disk arrays 25, processor buses 26 and disk array buses 27 as in parallel computer system 20. However, serial link DASD controller 42 is substituted for parallel DASD controller 22. Although three processors, three disk arrays, and six adapters are shown, any number of processors and disk arrays together with their associated adapters are possible in computer system 40.

DASD controller 42 contains serial cache 44. Serial adapter 46 provides the interface between processor 24 or disk array 25 and cache 44, connected through processor bus 26 or disk array bus 27 respectively and adapter 46. A performance increase will occur by replacing parallel bus 32 with bidirectional multichannel serial link 48 between each adapter 46 and cache 44.

Figure 3:
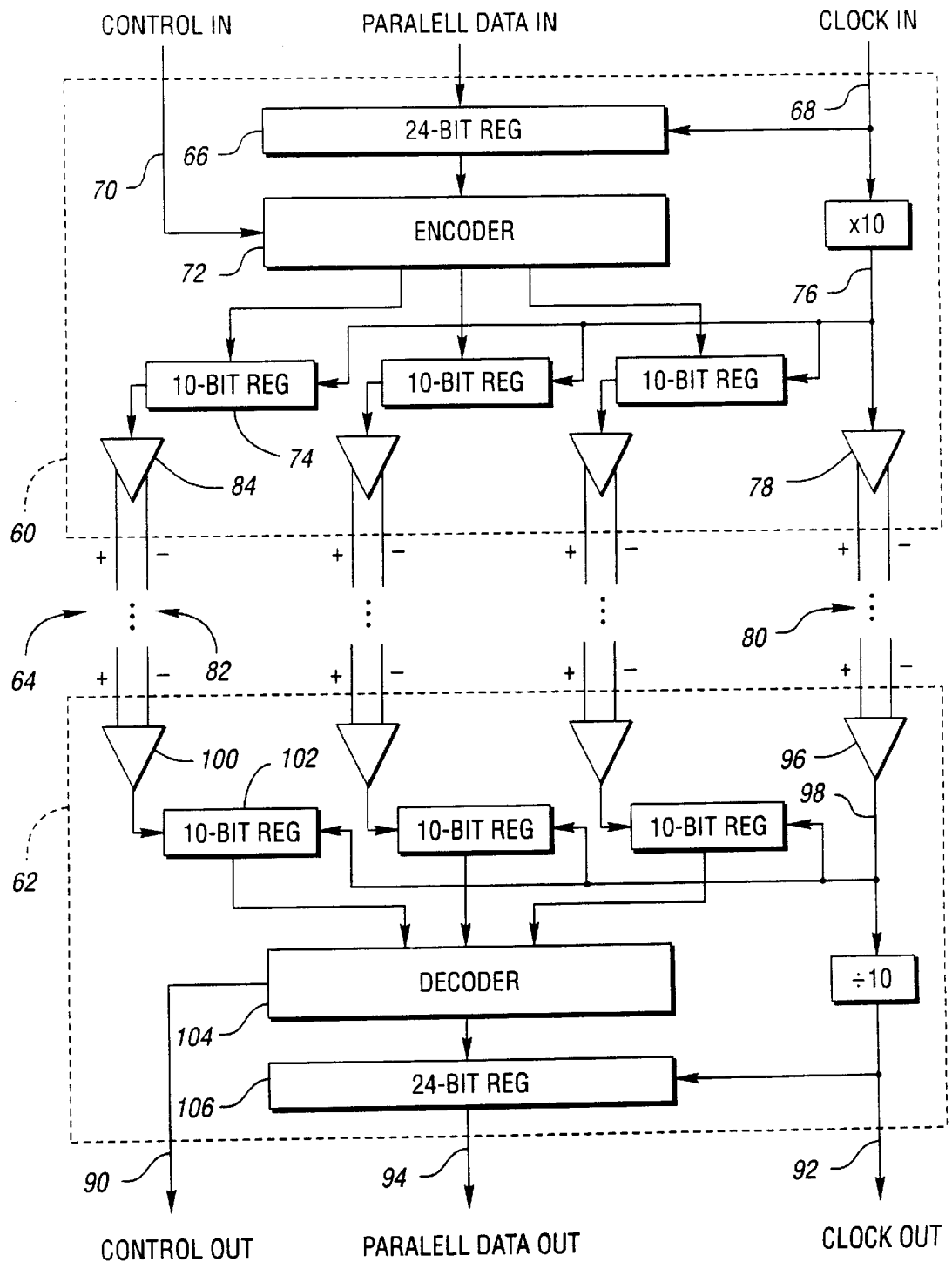
FIG. 3 is a schematic diagram of a set of driver and receiver pairs implementing a multichannel serial link according to the present invention.

Referring now to FIG. 3, a schematic diagram of a set of driver and receiver pairs implementing a multichannel serial link according to the present invention is shown. Each bidirectional multichannel serial link 48 includes two unidirectional multichannel serial links, each unidirectional link providing communication in one direction. Group serial transmitter 60 (TX) sends and group serial receiver 62 (RX) receives serial signals over a set of three or more serial channels, shown generally by 64. Set of serial channels 64 connecting group serial transmitter 60 and group serial receiver 62 defines a point-to-point unidirectional multichannel serial path.

Group serial transmitter 60 accepts parallel data in input register 66 clocked by input parallel clock 68. Group serial transmitter 60 also accepts control input on control in bus 70. Control input may include, but is not limited to, indications for error, read frame, write frame, diagnostic frame, start of frame, and end of frame.

Encoder 72 receives control input from control in bus 70 and data from input register 66. Encoder 72 develops a parallel code corresponding to either the control input on control in bus 70 or the data value in input register 66 depending on the control input on control in bus 70. Parallel-to-serial register 74 accepts a portion of the parallel code from encoder 72 and shifts out a serial sequence bit stream clocked by serial clock 76. Serial clock 76 is produced by multiplying the frequency of input parallel clock 68 by a value equal to the number of bits in parallel-to-serial register 74. Serial clock driver 78 outputs a signal corresponding to serial clock 76 onto serial clock channel 80. Each of the remaining channels in set of serial channels 64 is a serial data channel, one of which is shown as 82, and is driven by a corresponding serial data driver 84. Serial data channel 82 transmits a signal corresponding to the serial sequence bit stream produced by parallel-to-serial register 74.

In a preferred embodiment, serial data drivers 78 and serial clock driver 84 are implemented with a serial flat panel display driver having a differential output such as the SII140 manufactured by Silicon Image, Inc. The non-standard use of serial flat panel display drivers allows construction of a high reliability communication link. This link has an inherently low cost due to the volume leverage of the flat panel display industry. Furthermore, continued developments in flat panel technology will produce increasing serial transfer rates and increasing functionality at decreasing piece prices.

In order to exploit the differential output of serial driver 78,84, encoder 72 is operative to produce a DC balanced signal. In particular, encoder 72 accepts a 24-bit input word and develops a 30-bit code. The 30-bit code is divided into three 10-bit codes, each of which is DC balanced within one bit. The one-bit out of-balance is compensated for by inserting idle clockings between frames. Each 10-bit code is clocked into a corresponding parallel-to-serial register 74.

Referring again to FIG. 3, group serial receiver 62 accepts serial channels 64 and outputs control on control out bus 90 corresponding to the control signal input on control in bus 70, output parallel clock 92 corresponding to input parallel clock 68, and output parallel data 94 clocked by output parallel clock 92 corresponding to the data received by input register 66.

Serial clock receiver 96 accepts serial clock channel 80 and outputs serial clock 98. Each serial channel 82 carrying a serial sequence bit stream is received by a serial data receiver 100. Serial data receiver 100 outputs a signal to serial-to-parallel register 102 clocked by serial clock 98. Each serial to-parallel register 102 delivers a parallel word to decoder 104. Decoder 104 produces a control signal on control out bus 90 or a parallel data word depending on the value received by decoder 104. Serial clock 98 is divided by a factor equal to the number of bits in serial-to-parallel register 102 to produce output parallel clock 92. Data output from decoder 104 is clocked into output register 106 by output parallel clock 92. The output of output register 106 is output parallel data 94.

In a preferred embodiment, serial data receivers 100 and serial clock receiver 96 are implemented with a serial flat panel display receiver having a differential input and matching serial data drivers 78 and serial clock driver 84, such as the SII141 manufactured by Silicon Image, Inc. Decoder 104 converts the balance coded input from serial-to-parallel registers 102 into an uncoded value. To match the encoding scheme used in group serial transmitter 60, three 10-bit registers 102 are used for serial-to-parallel conversion and the resulting 30-bit encoded value is decoded by decoder 104.

Figure 4:
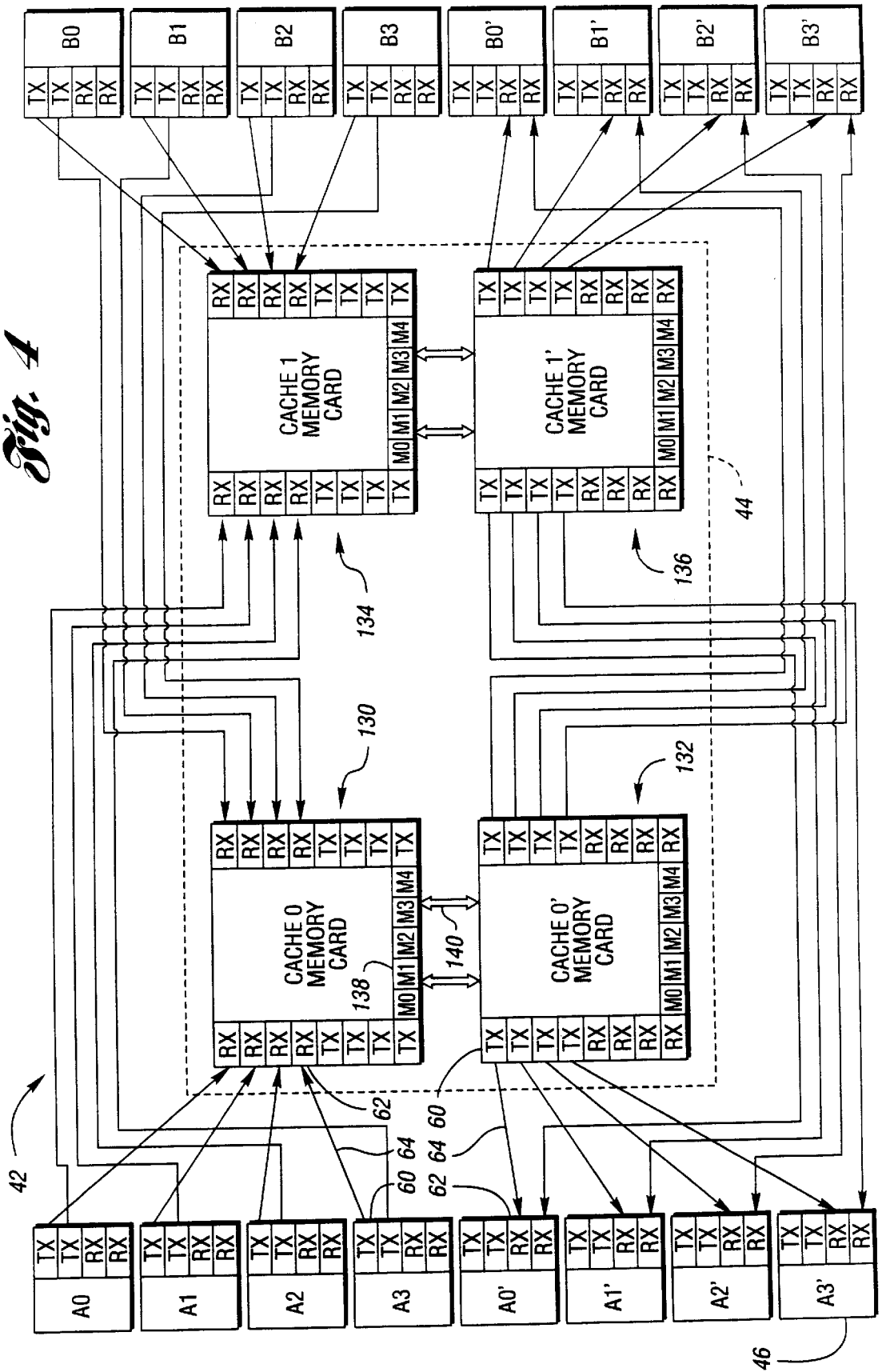
FIG. 4 is a schematic diagram of an illustrative cache architecture that may use the present invention showing a portion of the data connections.

Referring now to FIG. 4, a schematic diagram of an illustrative cache architecture according to the present invention is shown. As will be described below, only a portion of the data connections have been included.

In the example architecture, DASD controller 42 includes sixteen adapters, one of which is indicated by 46. Cache 44 is divided into at least one memory card. The example shown has four cards indicated as Cache 0 130, Cache 0' 132, Cache 1 134, and Cache 1' 136. Memory cards are grouped in pairs, one card being a master and one a slave. Master cards 130,134 are designated by cache numbers without primes and slave cards 132,136 by cache numbers with primes.

The memory on each card is divided into memory banks, one of which is indicated by 138. Each memory bank 138 can service one memory request at a time. In the exemplary embodiment shown, each memory card has five memory banks indicated by M0, M1, M2, M3, and M4.

In the exemplary embodiment, all master cards 130,134 are directly connected to each adapter 46 in the top half of arbiters indicated as A0 through A3 and B0 through B3. All slave cards 132,136 are directly connected to each adapter 46 in the bottom half of adapters 46 indicated as A0' through A3' and B0' through B3'. In FIG. 4, the data write links from adapters 46 to memory cards 130,134 for the top half and the data read links from memory cards 132,136 to adapters 46 for the bottom half are shown. In general, the adapters 46 are divided into two sets with every adapter 46 in a first set connected to each master memory card 130,134 and each adapter 46 in a second set connected to each slave memory card 132,136.

Interconnection between each memory card, such as 132, and its associated adapter 46 is through bi-directional multichannel serial links 48. Each link 48 is shown as a pair of unidirectional links comprising group serial transmitter 60 connected to group serial receiver 62 through serial channels 64. The operation of a unidirectional link is described with regards to FIG. 3 above.

It is advantageous to allow any adapter 46 to access any memory location. Therefore, each master-slave pair is connected by intercard data buses, one of which is indicated by 140. The use of intercard data buses 140 reduces the number of multichannel serial data links 64 required. Arbitration by the master card and the slave card, discussed with regards to FIGS. 6 through 8 below, determines access to memory banks 138.

Figure 5:
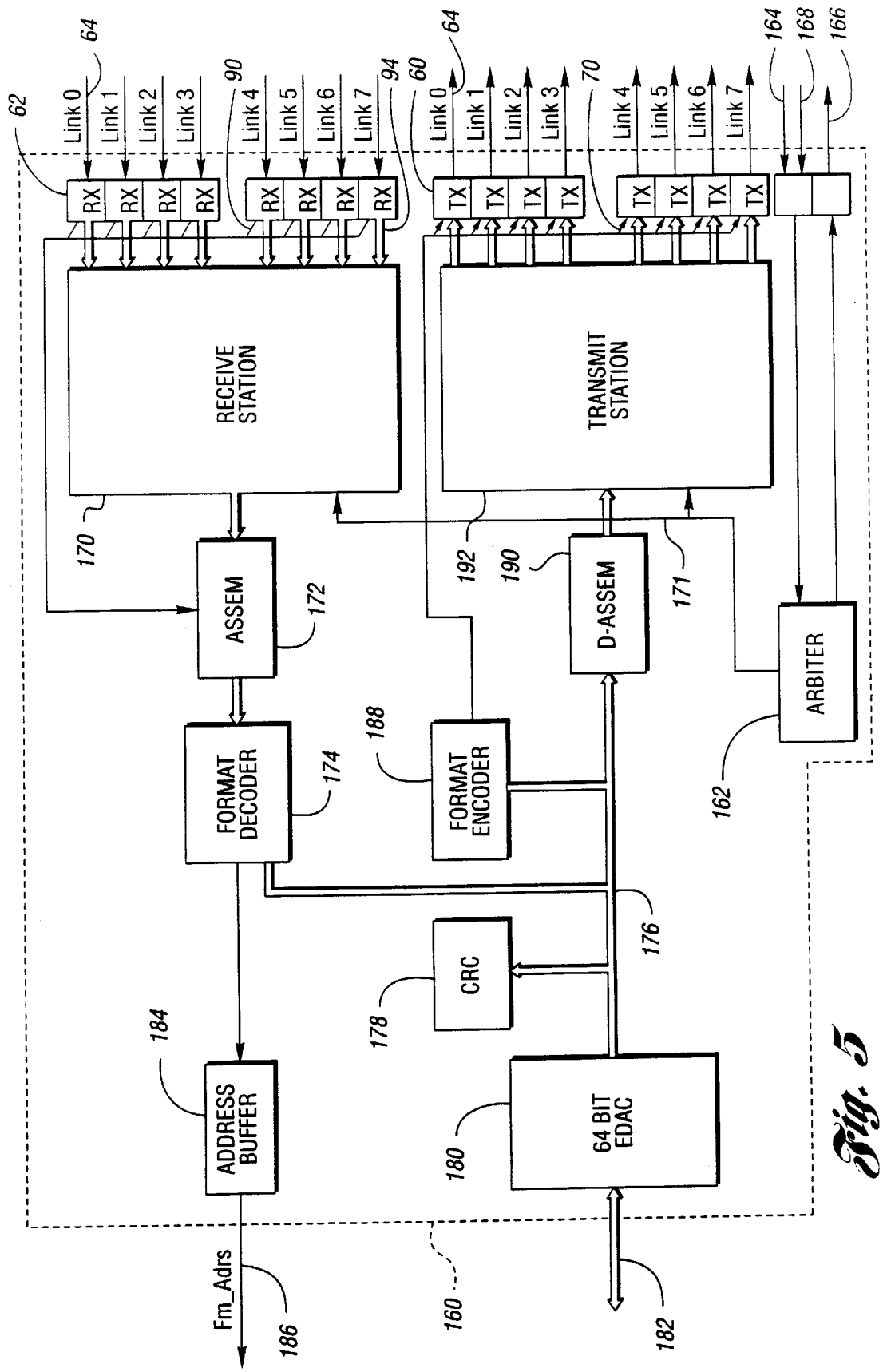
FIG. 5 is a schematic diagram of an exemplary serial hub for simplex operation according to the present invention.

Referring now to FIG. 5, a schematic diagram of an exemplary serial hub for simplex operation according to the present invention is shown. At least one simplex hub 160 is used on each memory card 130,132,134, 136 in embodiments of the present invention that use simplex hub 160. In FIG. 5, eight adapters are connected to hub 62, as indicated by the eight incoming unidirectional links 64 and eight outgoing unidirectional links 64. Each simplex hub 160 can provide access to one memory bank 138, not shown for clarity, during a memory access period.

Simplex arbiter 162 determines which adapter 46 connected to memory card 130,132,134,136 will be selected.

Each adapter 46 connected to hub 160 has a request line, the collection of which is indicated by request bus 164. Arbiter 162 indicates which adapter 46 is selected by asserting the corresponding grant line, the collection of which is indicated by grant bus 166. Adapter 46 is also connected to bank bus 168. Once granted access, adapter 46 indicates to which bank access is requested by placing the bank number on bank bus 168. Control and arbitration is further discussed with regards to FIGS. 7, 8, and 10 below.

The receive data path begins with a set of incoming unidirectional serial data links 64. Each link is connected to a group serial receiver 62, which outputs short parallel data 94 corresponding to a received sequence of serial bits. The operation of group serial receiver 62 is described with regards to FIG. 3 above. The output of each group serial receiver 62 is input into receive section 170. Receive section 170 operates as a multiplexer, using selected adapter signal 171 from arbiter 162 to select which group serial receiver 62 output to forward to assembler 172. Receive section 170 must switch between different group serial receivers 62, each driven by a clock in corresponding adapter 46, without allowing glitching. A design for glitchless receiving is described in U.S. Patent application (attorney docket 97-062-DSK) entitled "System and Method for Multiplexing Serial Links" by W. Burns and M. Lucas, which is hereby incorporated by reference.

Assembler 172 accepts three short parallel data words and constructs a wide parallel word. In the exemplary embodiment, short parallel data 94 is 24 bits and the wide parallel words are 72 bits. Format decoder 174 accepts the output of assembler 172 as well as frame commands from the control out bus 90 of each group serial receiver 62. Format decoder 174 decodes memory address and mode information contained in the frame commands. Format decoder 174 also identifies the field type, stores the current mode, and outputs control signals. Format encoder outputs data onto internal data bus 176.

Cyclic redundancy code (CRC) module 178 checks the accuracy of incoming data using bits included in the wide data word. Error detection and correction (EDAC) module 180 introduces bits to detect and correct errors introduced while data is stored in memory bank 138.

Each memory bank 138 served by hub 160 is connected to hub 160 through data bus 182. The address of the current write location in memory is held in address buffer 184 and sent to memory bank 138 on address bus 186. Address buffer is loaded by format decoder 174.

The transmit data path is substantially the reverse of the receive data path. Address buffer 184 puts out the location to be read on address bus 186. The data is read from memory bank 138 onto bus 182 and into EDAC module 180. EDAC module 180 checks and corrects errors introduced by data storage and outputs the corrected data to internal data bus 176. CRC module 178 adds bits for detecting and correcting errors in transmission. Format encoder 188 generates stage frame commands for delivery to each group serial transmitter 60.

Disassembler 190 breaks wide parallel words into short parallel words. Transmit section 192 serves as a demultiplexer, selecting the appropriate group serial transmitter 60 based on selected adapter signal 171. Data is sent from group serial transmitter 60 on unidirectional multichannel serial link 64.

Figure 6:
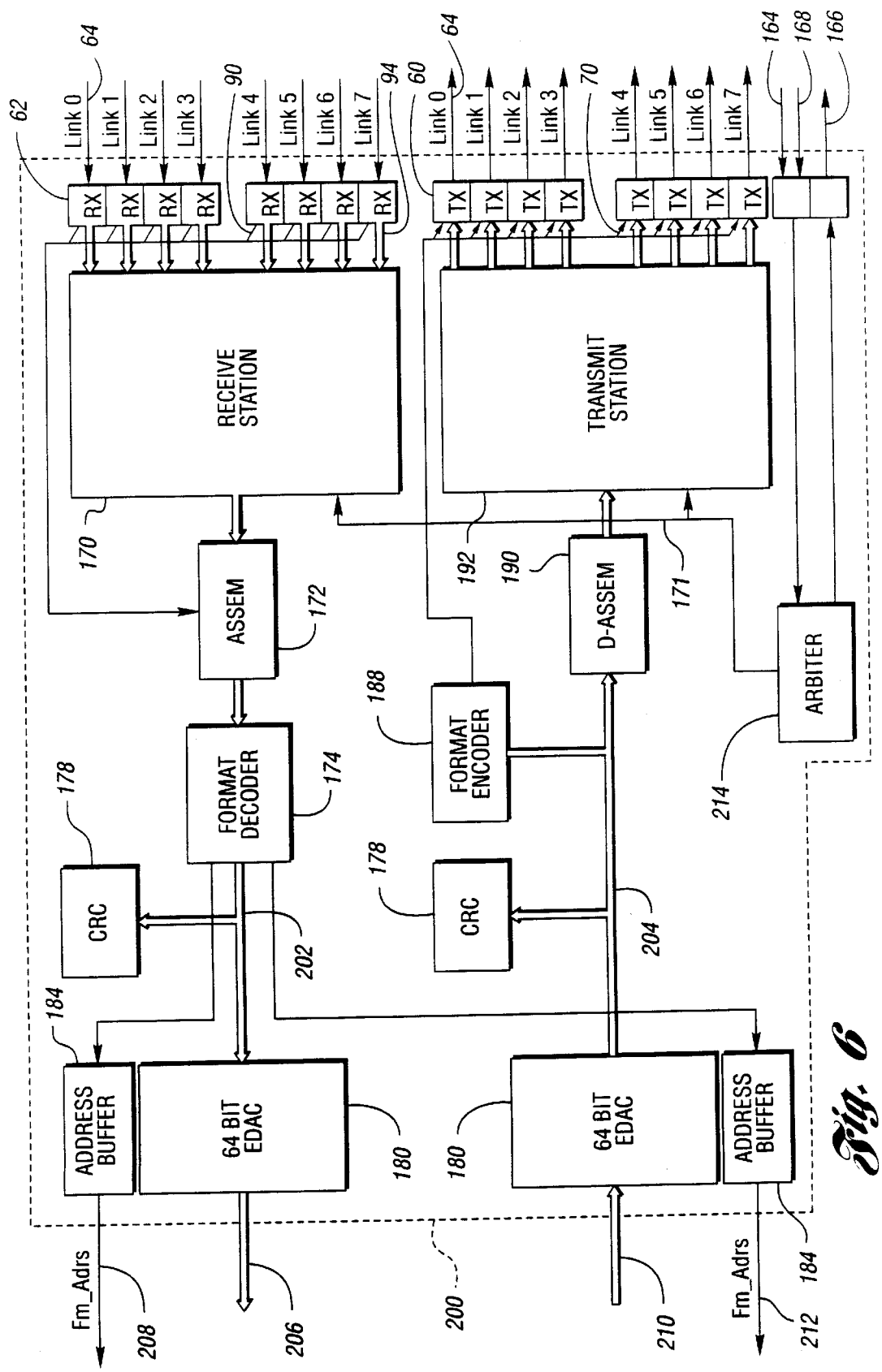
FIG. 6 is a schematic diagram of an exemplary serial hub for duplex operation according to the present invention.

Referring now to FIG. 6, a schematic diagram of an exemplary serial hub for duplex operation according to the present invention is shown. At least one duplex hub 200 is included on each memory card 130,132, 134,136 in embodiments of the present invention using duplex hub 200. The operation of duplex hub 200 is similar to the operation of simplex hub 160 described with regards to FIG. 5 above except that duplex hub 200 is capable of simultaneous memory read and write.

In order to accomplish simultaneous memory read and write, duplex hub 200 must have two copies of all memory access components. In particular, internal data bus 176 becomes internal write bus 202 and internal read bus 204. Two copies of CRC module 178, EDAC 180, and address buffer 184 are needed. Two buses to memory banks 138 are required. Write bus 206 sends data to memory at the location specified by write address 208. Read bus 210 receives data from memory at the location specified by read address 212.

Duplex arbiter 214 must determine if either or both of memory read and write will occur. Control and arbitration is described with regards to FIGS. 7, 9, 10, and 11 below.

Figure 7:
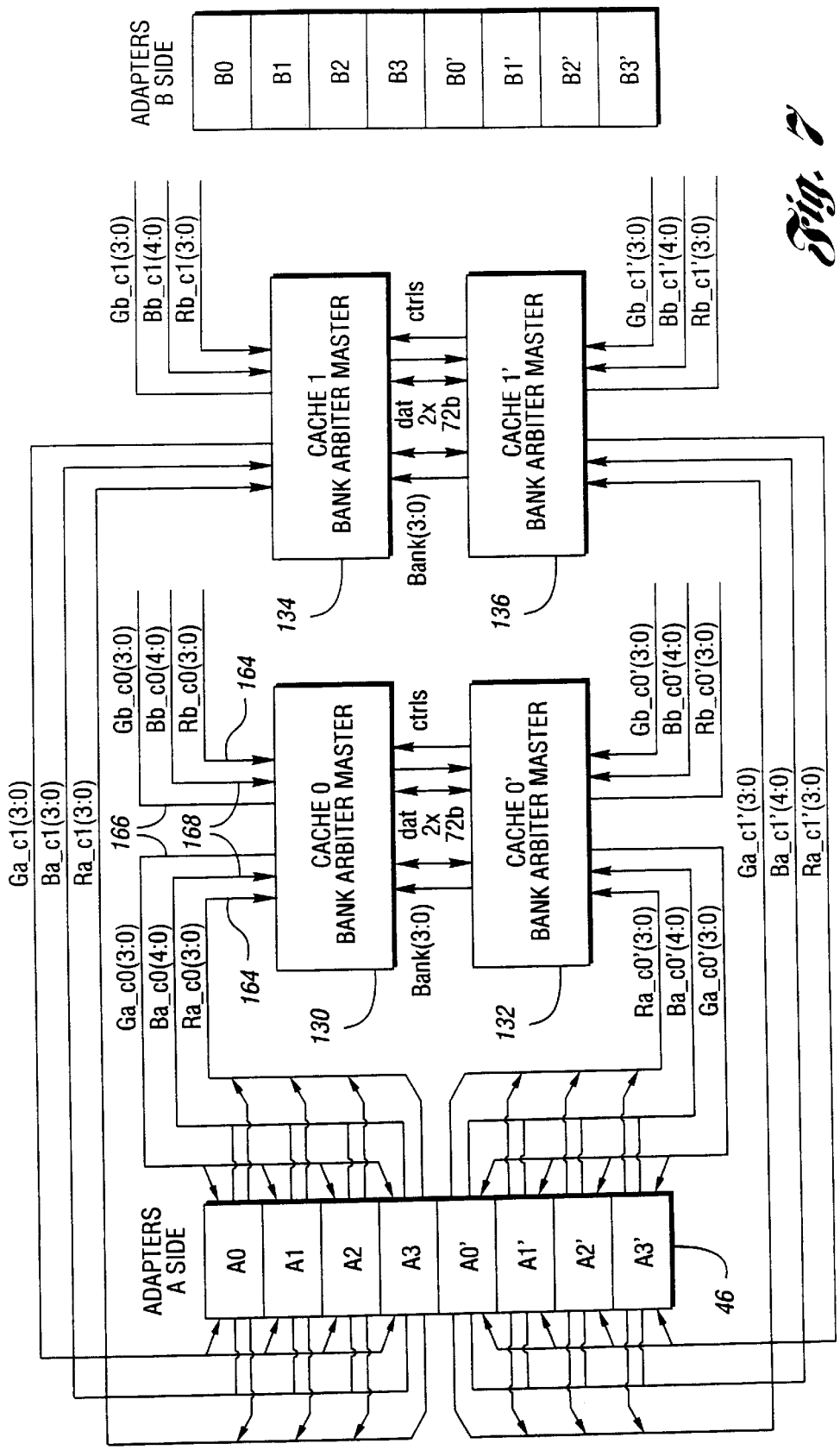
FIG. 7 is a schematic diagram of an illustrative control architecture according to the present invention.

Referring now to FIG. 7, a schematic diagram of an illustrative control architecture according to the present invention is shown. In the exemplary embodiment, sixteen adapters, one of which is indicated by 46, can access four memory cards 130,132,134,136. In a preferred embodiment, adapters are divided into "A side" and "B side". In FIG. 7, only the A side adapters 46 are shown connected. Each side is further divided into a top half and a bottom half, the adapters in the top half having number designations such as 0, 1, 2, . . . and the adapters in the bottom half having number designations with primes such as 0', 1', 2', . . . . One of ordinary skill in the art will recognize that the choice of top and bottom and of numerical designation is arbitrary.

Memory cards are also split into two groups, master memory cards 130,134 and slave memory cards 132,136, with each master having a corresponding slave. If an odd number of memory cards are used, there will be one more master than slave memory cards.

As with the data connections, each adapter 46 in the top half requests access directly to all master memory cards 130,134, and each adapter 46 in the bottom half requests access directly to all slave memory cards 132,136. A request line runs from each adapter 46 to all of the corresponding memory cards in the appropriate half. For example, adapter A0 has a request line to Cache 0 130, labeled Ra_c0(0), which is part of request bus 164 and a request line to Cache 1 134, labeled Ra_c1(0). A grant line runs to each adapter 46 from all of the corresponding memory cards in the appropriate half. For example, adapter A0 has a grant line from Cache 0 130, labeled Ga_c0(0), which is part of grant bus 166 and a grant line from Cache 1 134, labeled Ga_c1 (0).

A parallel bank bus connects adapter 46 in each half of each side with the corresponding memory card 130,132,134, 136. For example, adapter A0 is connected by bank bus 168, labeled Ba_c0(4:0), to Cache 0 130. All but one of the bank bus lines is used to send the address of the requested bank from adapter 46 to a corresponding memory card. In the exemplary embodiment, ten memory banks 138 in each pair of memory cards 130,132 require four lines. The last line in bank bus 168 is used by adapter 46 to signal that the bank address is valid. In the illustrative embodiment shown in FIG. 7, a separate bank bus is shown for each side of adapters 46 for redundancy. Timing diagrams describing the use of request, grant, and bank control lines is described with regards to FIGS. 8 and 11 below.

Figure 8:
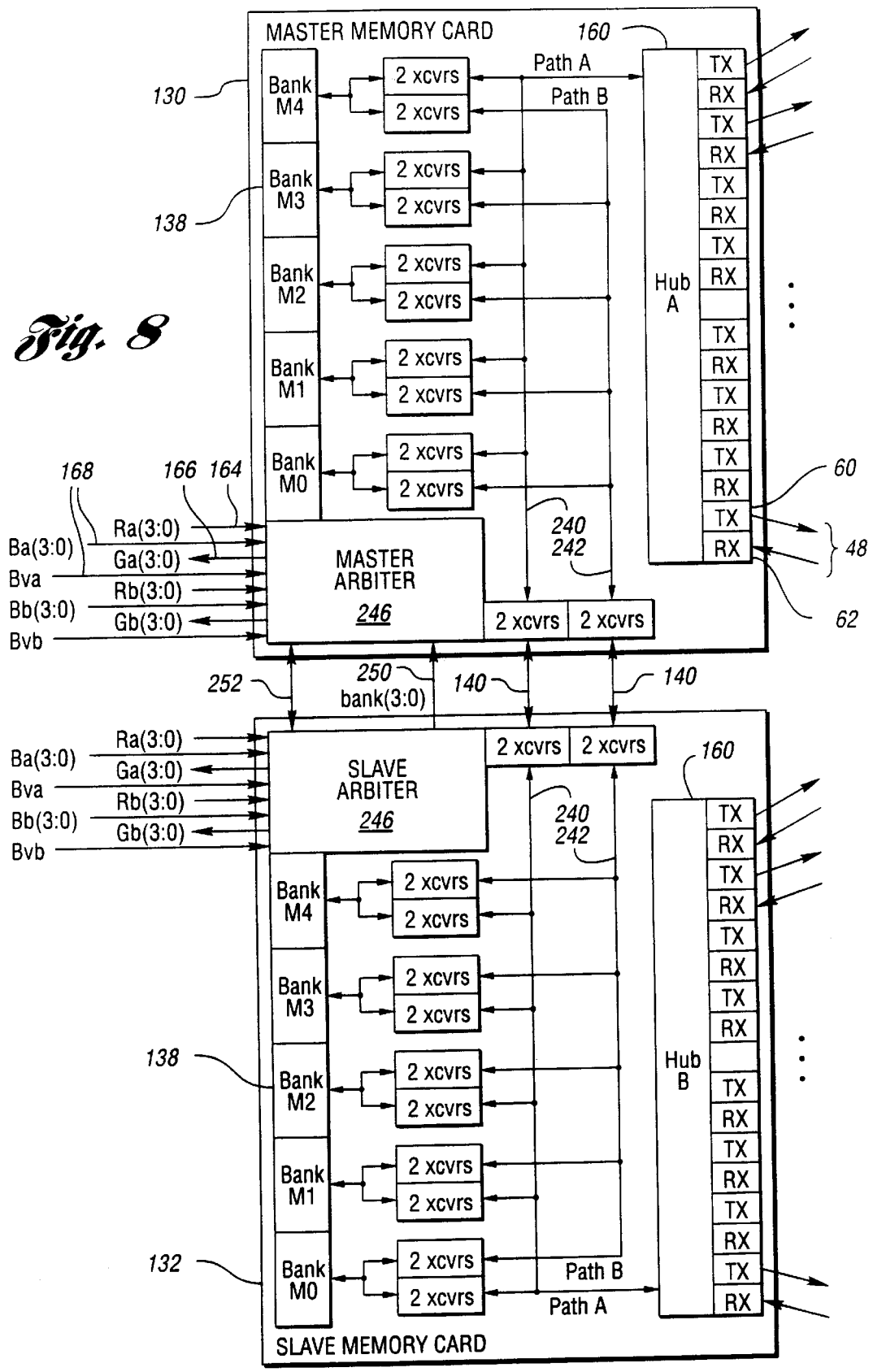
FIG. 8 is a schematic diagram of a pair of memory cards including simplex hubs that may be used in the architecture shown in FIG. 7.

Referring now to FIG. 8, a schematic diagram of a pair of memory cards including simplex hubs is shown. Operation of simplex hub 160 is described with regards to FIG. 5 above. In the exemplary embodiment, each memory card has five memory banks 138 and one hub 160 connected to eight adapters 46. Master memory card 130 shares data with slave memory card 132 through two intercard data buses 140. Each bus 140 corresponds to an intracard data path. Path A 240 connects hub 160 in Cache 0 130 to each of the five memory banks 138 in Cache 0 130 and, through a first intercard bus 140, to each of the five memory banks 138 in Cache 0' 132. Path B 242 connects hub 160 in Cache 0' 132 to each of the five memory banks 138 in Cache 0' 132 and, through a second intercard bus 140, to each of the five memory banks 138 in Cache 0 130. Transceiver pairs, one pair of which is labeled 244, provide a buffer between internal paths 240,242 and memory banks 138 and between internal paths 240,242 and intercard buses 140. In a preferred embodiment, paths 240,242, intercard buses 140, and memory banks 138 all have the same data width as the wide parallel word developed by assembler 172 described with regards to FIGS. 5 and 6 above. In the exemplary embodiment, this data width is 72 bits.

Each hub 160,200 in a master memory card such as Cache 0 130 has master arbiter 246. Master arbiter 246 may be arbiter 162 for simplex hub 160 or arbiter 214 for duplex hub 200. Each hub 160,200 in a slave memory card such as Cache 0' 132 has slave arbiter 248. Slave arbiter 248 may be arbiter 162 for simplex hub 160 or arbiter 214 for duplex hub 200. Each arbiter 246,248 is connected to adapters 46 in the appropriate half by request bus 164, grant bus 166, and bank bus 168, as described with regards to FIG. 7 above. In FIG. 8, for Cache 0 130, request bus 164 is split into two groups of connections, the A Side connections are labeled Ra(3:0) and the B Side connections are labeled Rb(3:0). Similarly, grant bus 166 is labeled Ga(3:0) for the A Side and Gb(3:0) for the B Side. Bank bus 168 has been split into two buses for redundancy. Each of these buses has been further split to show the bank address lines and bank valid line separately. The A side address bus is labeled Ba(3:0), the B side address bus is labeled Bb(3:0), the A Side bank valid line is labeled Bva, and the B Side bank valid line is labeled Bvb.

Intercard bank bus 250 provides master arbiter 246 with the bank address from a selected adapter 46 in the lower half of adapters. The purpose of intercard bank bus 250 will be described with regards to FIG. 10 below. Intercard control bus 252 carries control signals between master arbiter 246 and slave arbiter 248 for synchronization and acknowledgement.

In the exemplary embodiment with one hub 160 per memory card 130,132, each master memory card 130 and slave memory card 132 pair can provide access to two memory banks 138 simultaneously. Further, due to intercard data buses 140 and dual paths 240,242, both accesses may be on the same memory card 130,132. The decision as to which adapters 46 will be granted access comes from arbiters 246,248.

Figure 9:
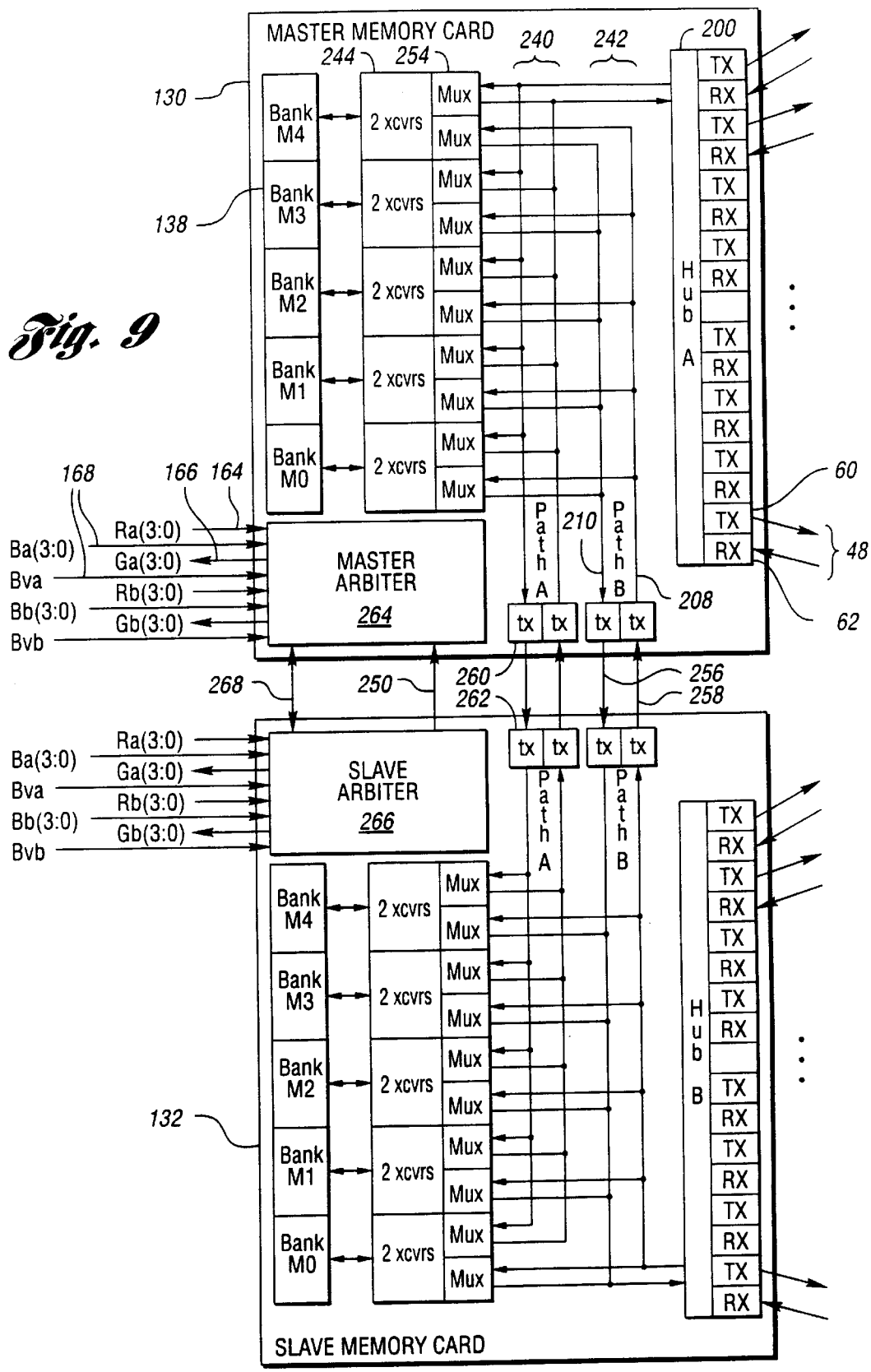
FIG. 9 is a schematic diagram of a pair of memory cards including duplex hubs that may be used in the architecture shown in FIG. 7.

Referring now to FIG. 9, a schematic diagram of a pair of memory cards including duplex hubs that may be used in the architecture shown in FIG. 7 is shown. Operation of duplex hub 200 is described with regards to FIG. 6 above. The operation of memory cards 130,132 with duplex hubs 200 is similar to the operation of memory cards with simplex hubs 160 described with regards to FIG. 8 above except that each hub can make two simultaneous memory accesses, a read and a write.

In the embodiment shown, each memory card 130,132 has one hub 200. As in the simplex case, a path connects each hub 200 in the card pair 130,132 with memory banks 138. Path A 240 connects hub 200 in master memory card 130 with memory banks 138 in both master memory card 130 and slave memory card 132. Path B 242 connects hub 200 in slave memory card 132 with memory banks 138 in both master memory card 130 and slave memory card 132. In order to support simultaneous write and read, each path 240,242 includes two data buses, write bus 208 and read bus 210. Multiplexer 254 before each transceiver pair 244 selects between write bus 208 and read bus 210. Intercard data bus 140 is doubled in width, with master-to-slave bus 256 providing for parallel data flow in one direction and slave-to-master bus 258 providing for parallel data flow in the other direction. Parallel transmitter 260 and parallel receiver 262 provide buffers for buses 256,258.

Each master memory card, such as Cache 0 130, has master arbiter 264. Each slave memory card, such as Cache 0' 132, has slave arbiter 266. Each arbiter 264,266 is connected to adapters 46 in the appropriate set of adapters 46 by request bus 164, grant bus 166, and bank bus 168, as described with regards to FIGS. 7 and 8 above. However, in order to permit simultaneous read and write for each hub, modifications are required.

In one embodiment, bank buses 168 are increased in size such that two bank addresses may be sent simultaneously. For example, bank buses 168 become Ba(7:0) and Bb(7:0) in FIG. 9. In a preferred embodiment, bank buses 168 are the same width and bank addresses are transmitted sequentially. For example, the memory read bank address is transmitted then the memory write bank address is transmitted.

Intercard bank bus 250 provides master arbiter 246 with the bank address from a selected adapter 46 in the lower half of adapters. The purpose of intercard bank bus 250 will be described with regards to FIG. 10 below. Intercard control bus 268 carries control signals between master arbiter 264 and slave arbiter 266 for synchronization and acknowledgement.

In the exemplary embodiment with one duplex hub 200 per memory card 130,132, each master memory card 130 and slave memory card 132 pair can provide access to four memory banks 138 simultaneously. Further, due to intercard data buses 256,258 and dual paths 240,242, all four accesses may be on the same memory card 130,132. The decision as to which adapters 46 will be granted access comes from arbiters 264,266. Arbitration is discussed with regards to FIGS. 10 and 11 below.

Figure 10:
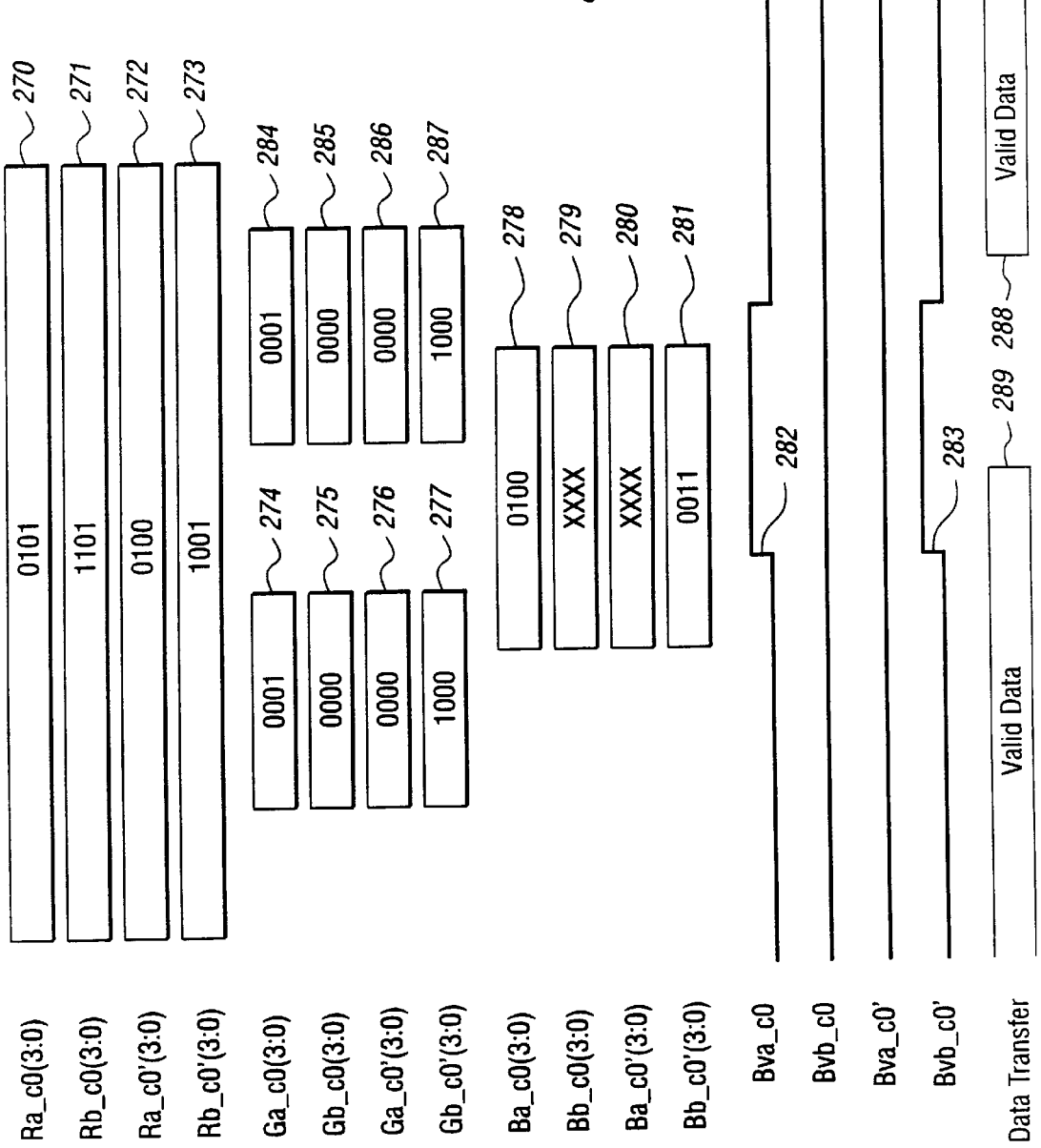
FIG. 10 is a conceptualized timing diagram illustrating a control sequence for a simplex embodiment of the present invention.

Referring now to FIG. 10, a conceptualized timing diagram illustrating a control sequence for the architecture of FIG. 7 is shown. The timing diagram shows one request sequence for Cache 0 130 and Cache 0' 132. The sequence begins with each adapter 46 desiring access asserting its corresponding request line of request bus 164. Request bus Ra_c0(3:0) indicates adapters A0 and A2 desire access to Cache 0 130, as shown by request signals 270. Request bus Rb_c0 indicates adapters B0, B2 and B3 desire access to Cache 0 130, as shown by request signals 271. Request bus Ra_c0' indicates adapter A2' desires access to Cache 0' 132, as shown by request signals 272. Request bus Rb_c0' indicates adapters B0' and B3' desire access to Cache 0' 132, as shown by request signal 273.

Arbiters 246,248 each select adapters 46 to which access may be granted. In general, one adapter 46 may be selected for each simplex hub 160 or duplex hub 200. One scheme for arbitration is a round robin selection that toggles priority between sides for each request sequence and takes adapters on each side in numerical order. For example, if all adapters desired access, the sequence of grants might be A0, B0, A1, B1, A2, . . . Other arbitration algorithms are possible, including granting priority to least recently used, least frequently used, most recently used, and random selection. Most recently used is attractive in that, if memory banks 138 are comprised of dynamic RAM (DRAM) arranged in rows, significant speedup can be achieved by accessing a row left open from the previous access. In a preferred embodiment, round robin priority is used.

Once adapter arbitration is decided, each arbiter 246,248 asserts the appropriate grant line of grant bus 166. For the illustrative timing diagram, adapters A0 and B3' have been selected as indicated by grant bus signal sets Ga_c0(3:0) 274, Gb_c0(3:0) 275, Ga_c0' (3:0) 276, and Gb_c0' (3:0) 277.

Each selected adapter 46 outputs the address of the desired memory bank 138. In the illustrative timing diagram, adapter A0 requests access to bank M4 of Cache 0 130 and adapter B3' requests access to bank M3 of Cache 0 130, as shown in bank signals 278 and 281. Since no adapter in the top half of Side B or the bottom half of Side A are selected, the values for bank signals 279 and 280 are irrelevant. Bank valid signal Bva_c0 282 is asserted by adapter A0 and is received by master arbiter 246 to indicate that bank signal 278 is valid. Likewise, Adapter B3' asserts signal Bvb_c0' 283 for slave arbiter 248.

Once asserted bank valid signals 282,283 are received by arbiters 246,248, bank arbitration begins. Since two or more selected adapters may request the same bank on the same memory card 130,132, bank arbitration is required. In the exemplary embodiment described in FIG. 10, if an arbiter from the lower half was selected, slave arbiter 248 forwards the bank number to master arbiter 246 on intercard bank bus 250. If an arbiter from the upper half was selected, master arbiter 246 then compares the bank address received from the selected adapter 46 with the bank address forwarded from slave arbiter 248. If the two requested banks are the same, master arbiter 246 selects which adapter 46 will gain access to memory. If the two requested banks are not the same or if less than two adapters 46 were selected, each selected adapter 46 is granted access. A bank arbitration method for one simplex hub 160 per memory card 130,132 is to always grant access to adapter 46 from a particular half such as, for example, always granting access to adapter 46 connected to master memory card 130. Another bank arbitration method is to alternate between top and bottom half adapters 46. In a preferred embodiment, fairness is achieved by alternating access between A-side and B-side adapters 46.

In an embodiment of the present invention, arbiters 246, 248 store the bank addresses of ungranted requests for use in subsequent arbitration. The stored bank addresses are compared with bank addresses received from selected adapters 46 to maximize utilization of memory banks 138 by minimizing bank conflicts.

Once bank arbitration is complete, arbiters 246,248 indicate to which adapters 46 access has been granted using grant bus 166. For the illustrative timing diagram, since no bank conflict exists, adapters A0 and B3' have been granted access as indicated by grant bus signal sets Ga_c0(3:0) 284, Gb_c0(3:0) 285, Ga_c0' (3:0) 286, and Gb_c0' (3:0) 287.

Data transfer may then begin, as indicated by new valid data signal 288. In a preferred embodiment, data transfer and arbitration are overlapped, as indicated by previous valid data signal 289.

The timing diagram in FIG. 10 may be modified for duplex hubs 200 connected to adapters 46 through wide bank buses 168. Both the transmit and receive bank address are provided in bank signal 278,281. After bank arbitration, two sequential grant signals 284,287 are then sent to each selected adapter 46, one indicating if the transmit bank address is granted and one indicating if the receive bank address is granted.

Figure 11:
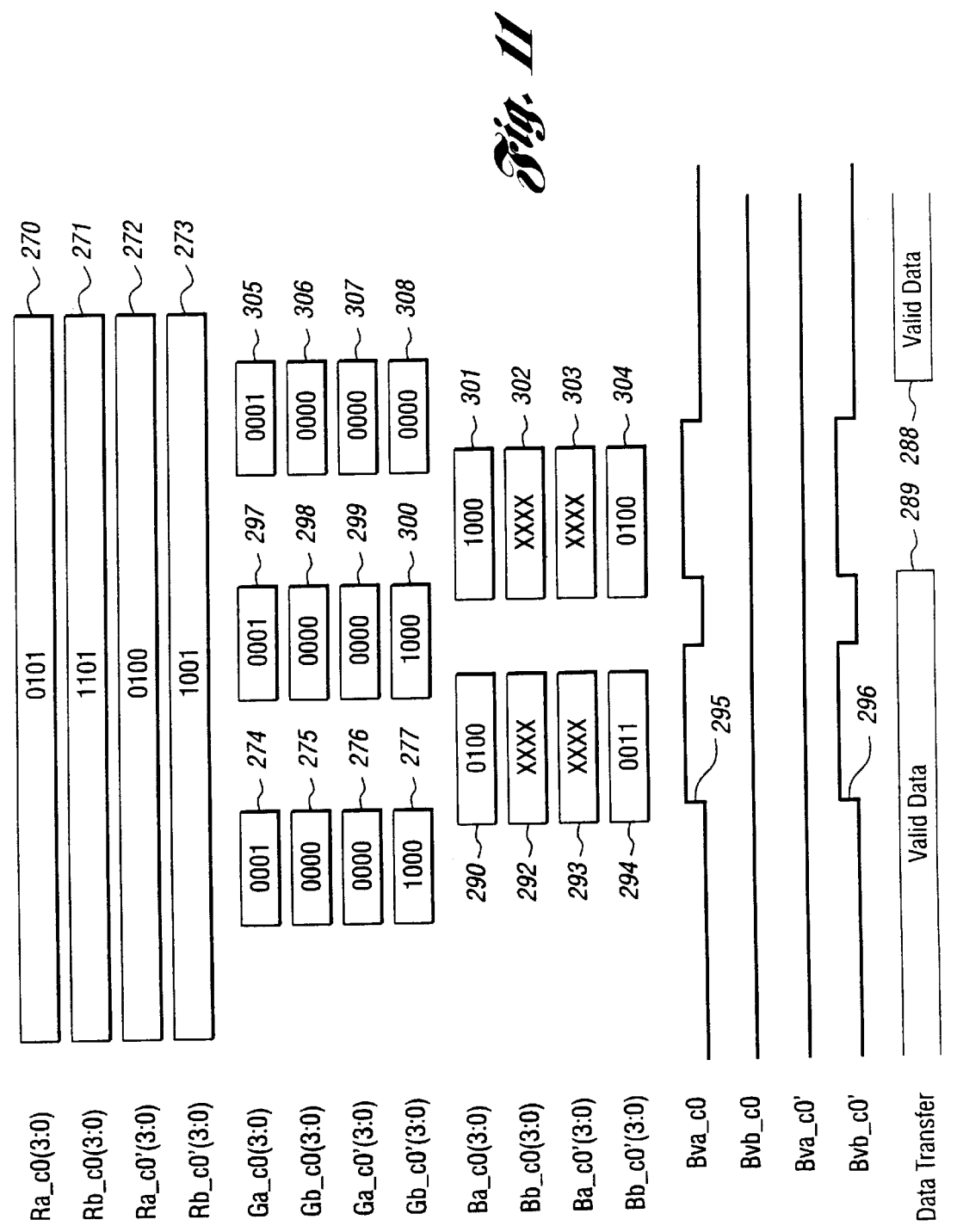

Referring now to FIG. 11, a conceptualized timing diagram illustrating an alternate control sequence for a duplex embodiment of the present invention is shown. In this embodiment, bank bus 168 has sufficient width to transmit one bank address at a time. Adapter 46 requests access to memory banks 138 by first sending the bank address for read then sending the bank address for write. Signals for adapter request 270, 271,272,273 and for adapter select 274,275, 276,277 are described with regards to FIG. 10 above.

Once selected, adapter 46 places the bank address desired for a write operation on bank bus 168. In the example, adapter A0 requests read access to bank M4 of Cache 0 130 in bank signal 290 and adapter B3' requests read access to bank M3 of Cache 0 130 in bank signal 294. The values of bank signals 292,293 from adapters not selected are not relevant. Bank valid signals 295,296 are asserted to indicate bank addresses are valid.

Grant signals 297,298,299,300 indicate that both read bank requests are granted by corresponding arbiters 264, 266. Selected adapters 46 now send requests for write access on bank buses 242. Adapter A0 requests write access to bank M8 in Cache 0' 132 in bank signal 301 and adapter B3' requests write access to bank M4 in Cache 0 130 in bank signal 304. Again, bank signals 302,303 on bank buses 168 to adapters 46 not selected are irrelevant. Bank valid signals 295,296 are again asserted to indicate valid bank address.

Grant signals 305,306,307,308 indicate that adapter A0 is granted write access to bank M0 of cache C0' 132. However, adapter B3' is not granted access to bank M4 of cache C0 130 since this would conflict with the read access granted to A0. Three simultaneous data transfers may now proceed, as indicated by data valid 288. As in the simplex case, arbitration may be overlapped with data transfer, as indicated by valid data 289 resulting from the previous arbitration.

The illustrative duplex bank granting technique described above favors memory reads by granting access to read bank requests first. Alternatively, write bank requests may be transmitted and arbitered first. Another possibility is to send both read and write bank addresses prior to any arbitration and then grant access to memory banks 138.

In an alternative embodiment of the present invention, bank bus 168 is wide enough to transmit both a read bank address and a write bank address simultaneously. For the illustrative example above, bank address signals 290, 294, 301, and 304 are transmitted concurrently. This reduces the hardware required in arbiters 246,248.

The timing diagrams of FIGS. 10 and 11 are conceptualized. The signals are not drawn to indicate actual lengths of time or time overlaps. Further, adapters 46 are not synchronized to each other and, therefore, signals from adapters 46 may not change simultaneously as shown.

Referring now to FIG. 12, a block diagram of tasks in adapter 46 control logic according to the present invention is shown. Simultaneous stage and destage in adapter 46 is facilitated through the use of concurrent tasks. Control task 320 accepts master orders and decomposes the master orders into read and write tasks, which are placed in read queue 322 and write queue 324 respectively. Read task 326 and write task 328 each take jobs from their respective queues, control data transfer, and report status.

Master orders 330 are received by master order task 332 in control task 320. Master order task 332 is responsible for decomposing master order 330 into read orders and write orders, determining which orders may be run in parallel, and controlling the functioning of other tasks. Master order 330 is divided into sections, each of which contains read and write operations that may be carried out in parallel. Once each section is completed, the operations in the next section may be carried out in parallel.

Master order task 332 places read and write orders into first-in first-out order queue 334. Orders are read from order queue 334 by manager task 336, which manages first-in first-out read queue 322 and first-in first-out write queue 324.

Read task 326 is initiated to handle a read order. Write task 328 is initiated to handle a write order. Both tasks transition through a sequence of phases including Setup, Initiate, Wait, Complete, and, if necessary, Error Recovery. Setup and Initiate take care of internal and external initialization, including partitioning the read or write order into blocks of a size handled by adapter 46 and cache 48 hardware. These blocks are then received as read data 338 or write data 340. Wait is entered while each block is received or transmitted. If all blocks are handled successfully, a Complete state is entered. If an error occurred, Error Recovery state is entered.

Read task 326 provides read status 342 to master order task 332. Write task 328 provides write status 344 to master order task 332. The status 342,344 indicates the success or failure of read and write orders. Master order task 332 must be capable of receiving status 342,344 in any order, since read and write orders may be processed asynchronously and nonsequentially. Master order task 332 reports master order status 346.

In a preferred embodiment, multiple read tasks 326 and write tasks 328 may exist concurrently, allowing adapter 46 to proceed with simultaneous staging and destaging if access to a desired memory bank 138 is blocked.

In a preferred embodiment, write task 328 is capable of transmitting the same information to multiple locations to facilitate data mirroring for use in, for example, RAID implementations.

While the best modes for carrying out the invention has been described in detail, those familiar with the art to which this invention relates will recognize various alternative designs and embodiments for practicing the invention as defined by the following claims.

What is claimed is:

1. A cache system serving a plurality of computer elements comprising at least one processor and at least one disk array, the system comprising:

a plurality of adapters, each adapter in communication with one computer element, each adapter belonging to either a first set of adapters or a second set of adapters;

at least one master memory card;

at least one slave memory card, each slave memory card in communication with a corresponding master memory card; and a plurality of bidirectional multichannel serial data links, each link connecting one adapter with one memory card such that every adapter in the first set of adapters is connected to every master memory card and such that every adapter in the second set of adapters is connected to every slave memory card.

2. The cache system as in claim 1 wherein each memory card comprises a plurality of memory banks and at least one hub, each of the at least one hub in communication with every memory bank on the memory card containing the at least one hub.

3. The cache system as in claim 2 wherein each hub on each slave memory card is operative to access each memory bank on the corresponding master memory card and each hub on the corresponding master memory card is operative to access each memory bank on the slave memory card.

4. The cache system as in claim 2 wherein the at least one hub is one hub and the plurality of memory banks is five memory banks.

5. The cache system as in claim 2 wherein the at least one hub is a simplex hub, permitting either memory read or memory write during a memory access period.

6. The cache system as in claim 2 wherein the at least one hub is a duplex hub, permitting simultaneous memory read and memory write during a memory access period.

7. The cache system as in claim 1 wherein each bidirectional multichannel serial link comprises:
   a plurality of serial data drivers in each of the plurality of adapters and a plurality of serial data receivers in each memory card, each memory card being a memory card from a set consisting of the at least one master memory card and the at least one slave memory card, each serial data receiver in each memory card corresponding to one of the plurality of serial data drivers in each of the plurality of adapters;
   a first plurality of unidirectional pairs, each pair carrying serial data from one of the plurality of serial data drivers in each of the plurality of adapters to the corresponding serial data receiver in each memory card;
   a plurality of serial data drivers in each memory card and a plurality of serial data receivers in each of the plurality of adapters, each serial data receiver in each of the plurality of adapters corresponding to one of the plurality of serial data drivers in each memory card; and
   a second plurality of unidirectional pairs, each pair carrying serial data from one of the serial data drivers in each memory card to the corresponding serial data receiver in each of the plurality of adapters.

8. The cache system as in claim 1 wherein each direction of the bidirectional multichannel serial link comprises:
   a plurality of serial data drivers;
   a serial data receiver corresponding to each of the plurality of serial data drivers, the serial data receiver in communication with the corresponding serial data driver;
   a serial clock driver; and
   a serial clock receiver in communication with the serial clock driver.

9. The cache system as in claim 8 wherein at least one serial data driver comprises a flat panel display driver.

10. The cache system as in claim 8 wherein at least one serial data receiver comprises a flat panel display receiver.

11. The cache system as in claim 8 wherein the serial clock driver comprises a flat panel display driver.

12. The cache system as in claim 8 wherein the serial clock receiver comprises a flat panel display receiver.

13. The cache system as in claim 8 wherein each direction of the bidirectional multichannel serial link further comprises a group serial transmitter, the group serial transmitter operative to
   (a) input a parallel data value at a slow clock rate;
   (b) convert the parallel data value into a plurality of serial sequences;
   (c) generate a fast clock rate from the slow clock rate;
   (d) transmit each serial sequence using one of the plurality of serial data drivers at a rate determined by the fast clock rate; and
   (e) transmit a signal corresponding to the fast clock rate using the serial clock driver.

14. The cache system as in claim 13 wherein each direction of the bidirectional multichannel serial link further comprises a group serial receiver, the group serial receiver operative to:
   (a) accept a signal corresponding to the fast clock rate from the serial clock driver;
   (b) accept the plurality of serial sequences from the plurality of serial data drivers;
   (c) generate a slow clock rate from the fast clock rate;
   (d) convert the plurality of serial sequences to a parallel representation of the data value;
   (e) output the parallel representation of a data value at the slow clock rate; and
   (f) output a signal corresponding to the slow clock rate.

15. The cache system as in claim 1 wherein each adapter comprises a control logic, the control logic comprising:
   a control task operative to receive a master order, to decompose the master order into read orders and write orders, and to receive status information;
   a read queue in communication with the control task, the read queue operative to hold read orders;
   at least one read task in communication with the read queue, the read task operative to input at least one cache read order, decompose the at least one read order into a sequence of cache reads, control the sequence of cache reads, and transmit status information to the control task;
   a write queue in communication with the control task, the write queue operative to hold write orders; and
   at least one write task in communication with the write queue, the write task operative to input at least one cache write order, decompose the at least one write order into a sequence of cache writes, control the sequence of cache writes, and transmit status information to the control task.

16. The cache system as in claim 15, the write task further operative to send a same sequence of cache writes to a plurality of memory banks thereby implementing data mirroring.

17. A cache system serving a plurality of computer elements comprising:
   a first set of adapters, each adapter in the first set in communication with at least one computer element;
   a second set of adapters, each adapter in the second set in communication with at least one computer element;
   at least one slave memory card, each of the at least on slave memory card operable to send and receive data directly with each adapter in the second set using a data link and each slave memory card comprising at least one memory bank and at least one hub, each hub comprising a slave arbiter, the slave arbiter operable to determine adapters selected to access the slave memory card; and
   at least one master memory card, each of the at least one master memory card operable to send and receive data directly with each adapter in the first set using a data link, each master memory card further operable to send data to and receive data from a corresponding slave memory card, and each master memory card comprising at least one memory bank and at least one hub, each hub comprising a master arbiter, the master arbiter operable to determine adapters selected to access the master memory card and to determine if the selected adapters from the first and second sets of adapters are granted access to memory banks on the master memory card and the corresponding slave memory card.

18. The cache system as in claim 17 wherein each data link is a bidirectional serial multichannel data link.

19. The cache system as in claim 17 further comprising:

a request line from each adapter in the second set to each slave arbiter, each adapter in the second set operable to assert the request line when access to the corresponding slave memory card is desired;

a grant line from each slave arbiter to each adapter in the second set;

wherein each slave arbiter is further operable to determine a selected second set adapter to which access will be granted for a data access period and to assert the grant line to the selected adapter;

a request line from each adapter in the first set to each master arbiter, each adapter in the first set operable to assert the request line when access to the corresponding master memory card is desired; and a grant line from each master arbiter to each adapter in the first set;

wherein each master arbiter is further operable to determine a selected first set adapter to which access will be granted for a data access period and to assert the grant line to the selected first set adapter.

20. The cache system as in claim 19 further comprising:

at least one master bank bus, each master bank bus connecting one master arbiter to at least one first set adapter, each of the at least one first set adapter further operable to place a memory bank address to which access is requested on the master bank bus;

at least one slave bank bus, each slave bank bus connecting one slave arbiter to at least one second set adapter, each of the at least one second set adapter further operable to place a memory bank address to which access is requested on the slave bank bus; and an intercard bank bus connecting each slave arbiter to a corresponding master arbiter.

21. The cache system as in claim 20 wherein each slave arbiter is operable to forward the second set adapter bank address to the corresponding master arbiter and the corresponding master arbiter is operable to determine if a bank conflict exists between the first set adapter memory bank address and the second set adapter memory bank address and, if a bank conflict exists, to determine which adapter will be granted access to the requested memory bank.

22. In a cache memory system comprised of adapters and memory cards, wherein each adapter is in communication with a computer element such as a processor or a disk array and each adapter belongs to a first set of adapters or a second set of adapters, wherein memory in each memory card is divided into at least one addressable memory bank and each memory card is either a master memory card or a slave memory card, and wherein each adapter in the first set is in communication with each master memory card, each adapter in the second set is in communication with each slave memory card, and each slave memory card is in communication with a corresponding master memory card, the slave memory card and the corresponding master memory card forming a card pair, for at least one card pair a method for arbitrating access to a cache memory system comprising:

receiving an access request in the master memory card from each adapter in the first set requesting access to memory within the card pair;

receiving an access request in the slave memory card from each adapter in the second set requesting access to memory within the card pair;

determining at least one selected first set adapter if any first set adapter has requested access;

determining at least one selected second set adapter if any second set adapter has requested access;

receiving at least one memory bank address in the master memory card from each selected first set adapter if any selected first set adapter is determined;

receiving at least one memory bank address in the slave memory card from each selected second set adapter if any selected second set adapter is determined;

granting access to each selected adapter from the first set of adapters and the second set of adapters based on preventing more than one access to each memory bank; and repeating for each arbitration period receiving an access request in the master memory card, receiving an access request in the slave memory card, determining at least one selected first set adapter, determining at least one selected second set adapter, receiving at least one memory bank address in the master memory card, receiving at least one memory bank address in the slave memory card, and granting access to selected adapters.

23. A method as in claim 22 wherein each memory bank is divided into addressable rows, determining at least one selected first set adapter and determining at least one selected second set adapter are based on the addresses of rows accessed during a previous arbitration period.

24. A method as in claim 22 wherein each adapter is assigned to a side, determining at least one selected first set adapter and determining at least one selected second set adapter are based on the side to which an adapter is assigned.

25. The method as in claim 24 wherein each adapter is further assigned a number, determining at least one selected first set adapter and determining at least one selected second set adapter are based on a round robin algorithm, the algorithm using the adapter number within each side.

26. The method as in claim 22 wherein at most one adapter from the first set of adapters is selected by the master memory card and at most one adapter from the second set of adapters is selected by the slave memory card and wherein at most one bank address is received by the master memory card and at most one bank address is received by the slave memory card, granting access to selected adapters comprises always determining the granted adapters as the selected first set adapter if the bank address from the first set adapter equals the bank address of the second set adapter.

* * * * *